United States Patent
Lieh

(10) Patent No.: US 7,909,716 B2
(45) Date of Patent: Mar. 22, 2011

(54) DUAL-RATCHET WHEEL TRANSMISSION APPARATUS

(76) Inventor: Junghsen Lieh, Beavercreek, OH (US)

( * ) Notice: Subject to any disclaimer, the term of this patent is extended or adjusted under 35 U.S.C. 154(b) by 444 days.

(21) Appl. No.: 12/119,602

(22) Filed: May 13, 2008

(65) Prior Publication Data

US 2009/0286638 A1   Nov. 19, 2009

(51) Int. Cl.
*F16H 59/00*   (2006.01)
(52) U.S. Cl. ............... 474/72; 474/69; 474/86; 474/148
(58) Field of Classification Search ............ 474/69, 474/72, 86, 148
See application file for complete search history.

(56) References Cited

U.S. PATENT DOCUMENTS

| | | | | |
|---|---|---|---|---|
| 4,304,150 A | * | 12/1981 | Lupo et al. | 475/51 |
| 4,577,849 A | * | 3/1986 | Watanabe | 271/9.02 |
| 4,608,885 A | * | 9/1986 | Koivunen | 475/210 |
| 4,630,504 A | * | 12/1986 | Smirl | 474/8 |
| 5,632,703 A | * | 5/1997 | Wilkes et al. | 475/211 |
| 6,146,296 A | * | 11/2000 | Apostolo | 474/73 |
| 7,155,788 B1 | * | 1/2007 | Chang | 29/27 C |
| 2006/0000464 A1 | * | 1/2006 | Marques et al. | 125/13.01 |
| 2007/0275802 A1 | * | 11/2007 | Potma | 474/101 |
| 2010/0125015 A1 | * | 5/2010 | Deno | 474/72 |

* cited by examiner

*Primary Examiner* — Emmanuel M Marcelo
(74) *Attorney, Agent, or Firm* — Chun-Ming Shih

(57) ABSTRACT

A dual-ratchet wheel transmission apparatus includes: a drive wheel set, having a first drive wheel and a second drive wheel coaxially integrated with a drive shaft; a driven wheel set, being coaxially set with a driven shaft in which the driven shaft is connected to an output for transmission, the driven wheel set including: a first driven wheel being centrally integrated with a unidirectional ratchet wheel, in which the first driven wheel engages with the first drive wheel for transmission, a second driven wheel being centrally integrated with another unidirectional ratchet wheel, in which the second driven wheel is connected to the second drive wheel via a transmission element. By the aforementioned configuration, whether the drive wheel set rotates forward or backward, the transmission set rotates in only one direction.

9 Claims, 9 Drawing Sheets

DUAL-RATCHET WHEEL TRANSMISSION APPARATUS

BACKGROUND OF THE INVENTION

1. Field of the Invention

The present invention relates to a transmission apparatus, more particularly, relates to a design applying dual-ratchet wheels, gear set, and transmission wheel set with transmission chain or belt. Thereby, regardless of the drive wheel set rotating forward or backward, the driven shaft can rotate unidirectionally and output power.

2. Description of the Prior Art

Ratchet wheels are mainly used in transmitting intermittent motion, or used in mechanical apparatuses with unidirectionally rotating shaft, in which the shaft solely rotates in one direction and idly spins in another direction. Thus the ratchet wheels are widely implemented in kinds of mechanical transmission apparatuses.

Conventional ratchet wheel transmission apparatuses are widely used, such as the disclosures of Taiwan Patent No. 90201202, entitled in "transmission sports vehicle". The prior art of reference discloses a transmission apparatus merged in a bike, and the transmission apparatus comprises a drive gear fixed on the pedal shaft for driving a driven gear, in which the driven gear is configured to transmit at least one unidirectional ratchet wheel set that rotates in reverse direction, and the driven gear then transmit a linking shaft that coaxially set with one small linking gear at each side thereof. The small linking gear at one side engages with the unidirectional ratchet wheel at one side of the driven gear, and the small linking gear at another side engages with a small gear, in which the small gear further engages with the unidirectional ratchet wheel at another side of the driven gear. Then, one linking gear of the linking shaft engages with a transmission gear, and the transmission element linking to the back wheel is centrally set on the shaft of the transmission gear for linking movement.

Another kind of ratchet wheel transmission apparatus is like the disclosures of Taiwan Patent No. 91107934, entitled in "driving forward apparatus of a bicycle". It comprises a forward rotation driving portion and a backward rotation driving portion. The backward rotation driving portion comprises transferring portion for rotation direction, driving disk, and ratchet wheel. The forward rotation driving portion comprises a driving disk fixed on the pedal axle by an axle key, wherein the driving disk is externally set with a detent; therefore the forward rotation of the pedal axle is able to be transferred to a driving chain wheel by a ratchet wheel fixed on one side of the driving chain wheel. The transferring portion for rotation direction comprises a driving gear integrated with the driving disk and having a central portion supported by a bearing onto the pedal axle, in which the driving gear rotates in reverse direction referring to the pedal axle by rotation from a fixed gear on the pedal axle. The driving disk is externally set with the detent and is integrated with the driving gear of the transferring portion for rotation direction. The ratchet wheel is fixed on another side of the driving chain wheel and is linked to the detent. In any rotation direction of the pedal axle, the bicycle can be driven to go forward.

In the aforementioned configurations, the previous one discloses the transmission sports vehicle with the body having a frame and a handle, in which the frame is set with a front wheel and a back wheel below and is set with a modulated transmission apparatus set, and the transmission apparatus set is linked to a pedal set on the top of the frame, and is linked to the back wheel via a transmission element. Therefore, it achieves modulated transmission in small size, with efficient transmission, and artistic in shape.

The latter one comprises a forward rotation driving portion and a backward rotation driving portion. The forward rotation driving portion is fixed on the pedal axle for transferring the forward rotation force of the pedal arm to the chain wheel, and the back rotation driving portion is fixed on the pedal axle for rotating the chain wheel forward via a transferring portion for rotation direction that transfers the backward rotation force of the pedal arm into the forward rotation force. Therefore, even the pedal rotates backward; the bicycle can still be driven to go forward as the pedal rotates forward.

It is understood that in response to different transmission requirements, corresponding configurations of gear train and ratchet wheel set are required to meet a pre-determined performance. Thus, the inventor of the present invention develops a technology and configuration that can achieve unidirectional rotation output no matter the input rotates forward or backward.

SUMMARY OF THE INVENTION

The primary objective of the present invention is to provide a dual-ratchet wheel transmission apparatus with a simple configuration that adopts ratchet wheels, gears, and sprockets (chain wheels) or pulleys. Thereby, whether the driving direction is forward or backward, the output transmission rotates in only one direction.

Another objective of the present invention is to provide a dual-ratchet wheel transmission apparatus with a driven wheel set in which the driven wheel set contains a first driven wheel and a second driven wheel coaxially mounted on the driven shaft. The configuration is simple and thus reduces manufacturing costs.

Yet another objective of the present invention is to provide a dual-ratchet wheel transmission apparatus with a driven wheel set in which the first driven wheel and the second driven wheel each is integrated with a ratchet wheel coaxially mounted on the driven shaft, and the driven shaft is then connected to the output. The new configuration has many applications and has market value.

The dual-ratchet wheel transmission apparatus that is able to achieve the aforementioned objectives mainly comprises: a drive wheel set, including a first drive wheel and a second drive wheel integrated with a drive shaft; a driven wheel set, being coaxially mounted on a driven shaft in which the driven shaft is connected to an output for transmission, the driven wheel set comprising: a first driven wheel being centrally integrated with a unidirectional ratchet wheel, in which the first driven wheel engages with the first drive wheel for transmission, a second driven wheel being centrally integrated with a unidirectional ratchet wheel, in which the second driven wheel is connected to the second drive wheel via a transmission element for transmitting torque, a transmission set being coaxially connected to the driven shaft, and receiving transmission power from the driven shaft. By the aforementioned configuration, whether the drive wheel set rotates forward or backward, the transmission set rotates in only one direction.

BRIEF DESCRIPTION OF THE DRAWINGS

The drawings disclose an illustrative embodiment of the present invention which serves to exemplify the various advantages and objectives hereof, and are as follows.

DETAILED DESCRIPTION OF THE PREFERRED EMBODIMENT

Figure 1:
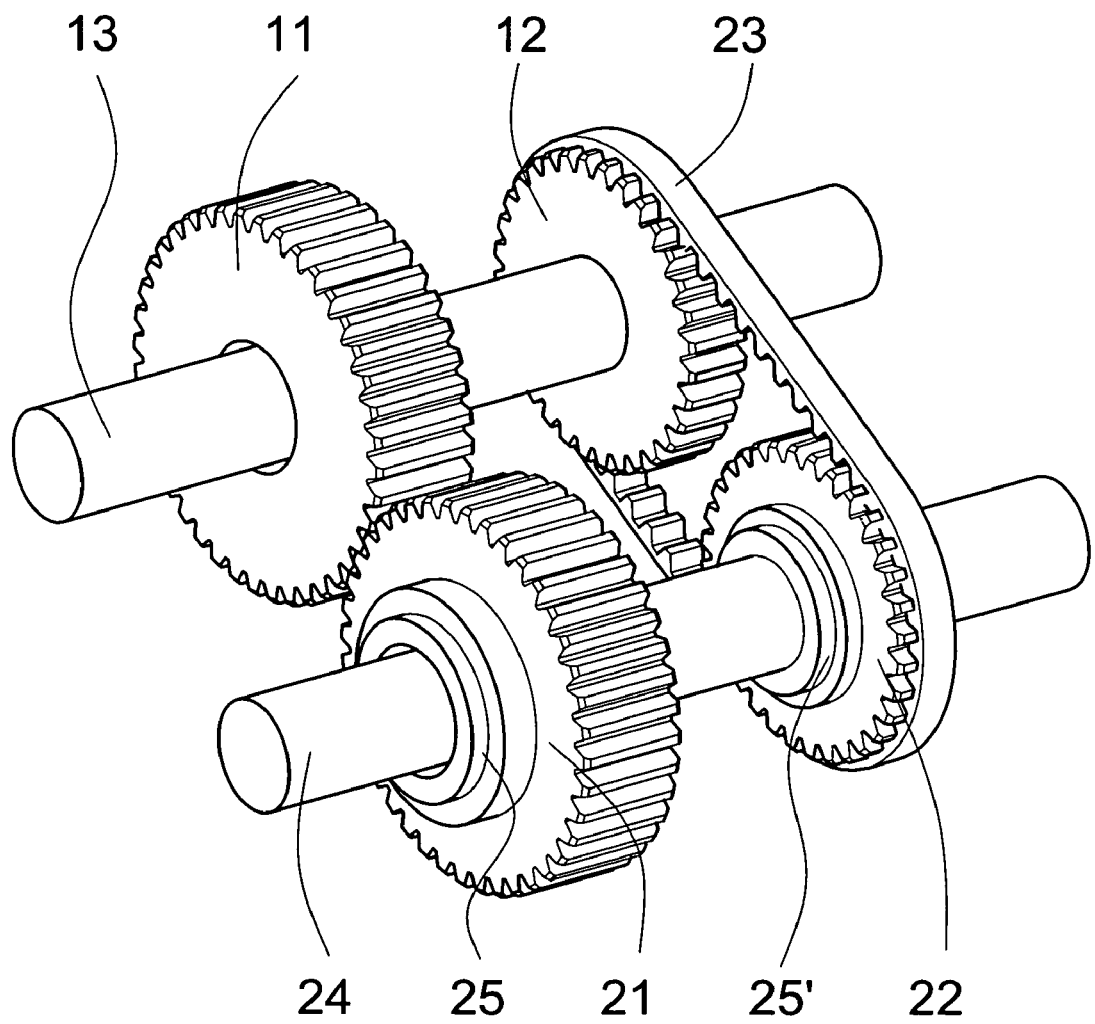
FIG. 1 is a perspective view of the dual-ratchet wheel transmission apparatus of the present invention.

Refer to FIG. 1, the present invention provides a dual-ratchet wheel transmission apparatus mainly comprising:

a drive wheel set, including a first drive wheel 11 and a second drive wheel 12 coaxially mounted on a drive shaft 13;

a driven wheel set, being coaxially set with a driven shaft 24 in which the driven shaft 24 is connected to an output element for power transmission, the driven wheel set comprising: a first driven wheel 21 being integrated with a unidirectional ratchet wheel 25, in which the first driven wheel 21 engages with the first drive wheel 11, a second driven wheel 22 being integrated with a unidirectional ratchet wheel 25', in which the second driven wheel 22 is connected to the second drive wheel 12 via a transmission element 23.

Figure 2:
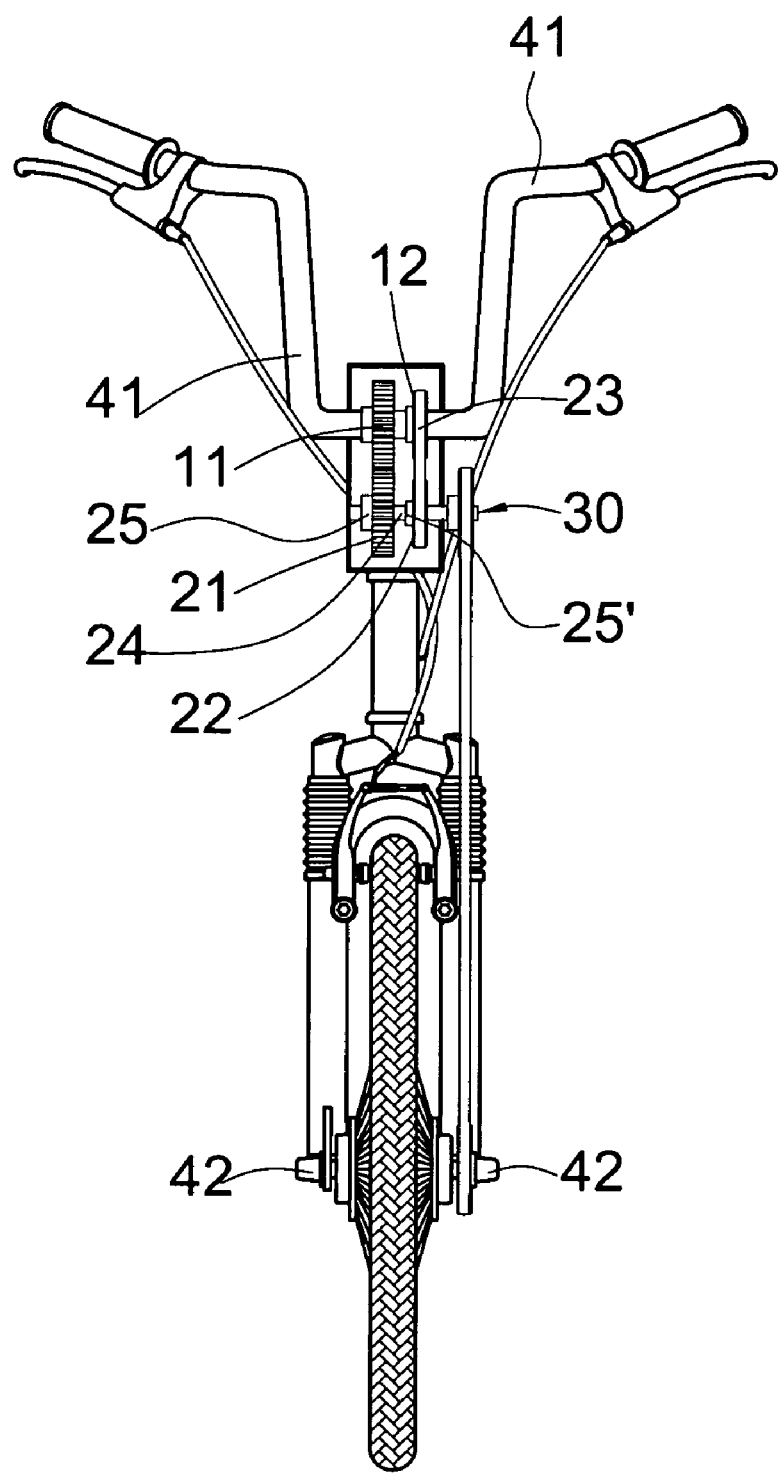
FIG. 2 illustrates the application status of the first preferred embodiment of the present invention.
Figure 3:
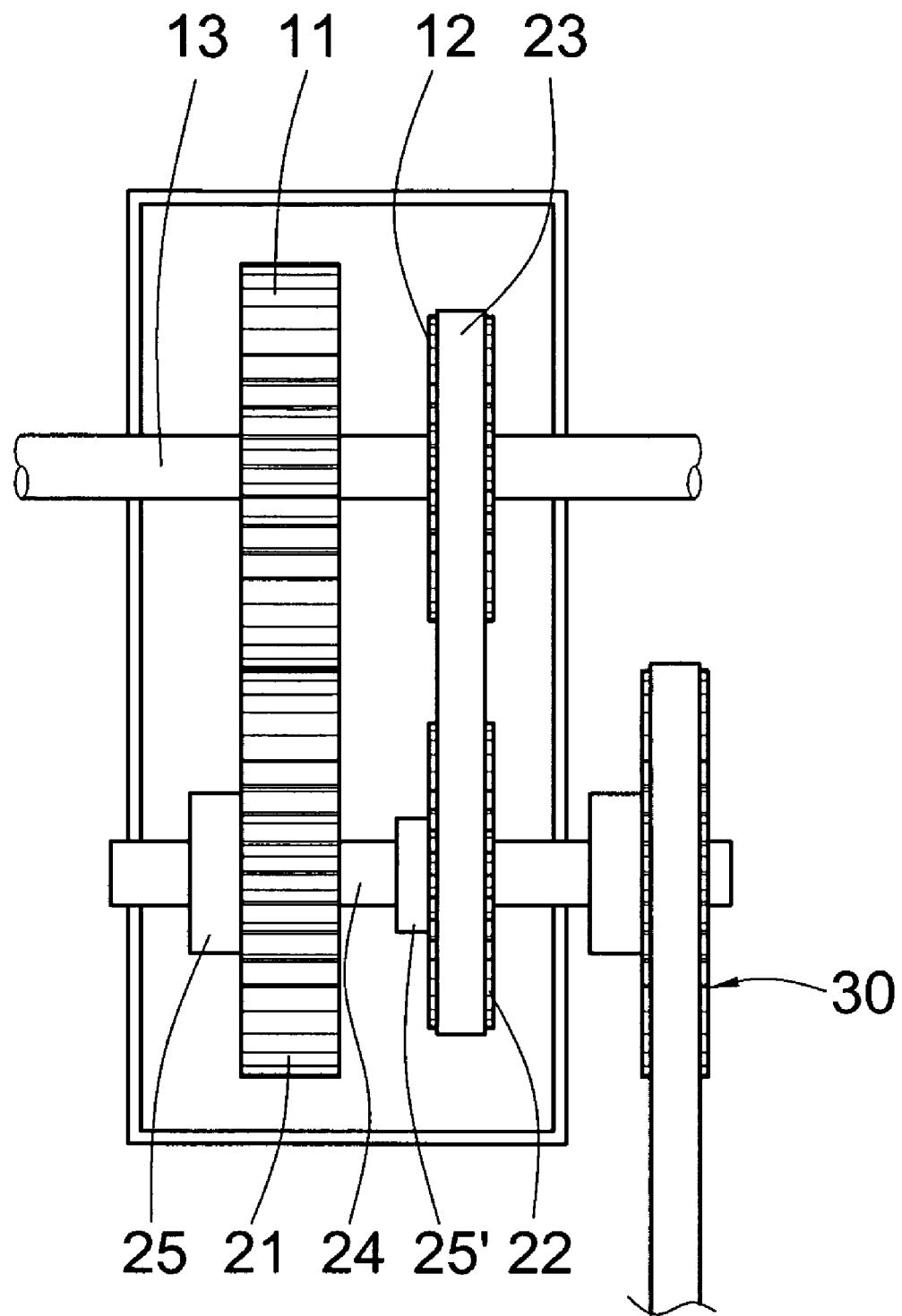
FIG. 3 is a plane-view diagram of the first preferred embodiment of the present invention.

Refer to FIGS. 2 and 3, an embodiment of the present invention being applied to a bicycle. The dual-ratchet wheel transmission apparatus mainly comprises: a drive wheel set, a driven wheel set engaging with the drive wheel set, and a transmission set 30 being configured to receive transmission output from the driven wheel set.

The drive wheel set is connected to the handlebar 41 of a bicycle, and is coaxially integrated with a first drive wheel 11 (a gear) and a second drive wheel 12. The driven wheel set is coaxially set with a first driven wheel 21 (a gear) and a second driven wheel 22, in which the first driven wheel 21 and the second driven wheel 22 are integrated with unidirectional ratchet wheels 25 and 25' respectively, the first driven wheel 21 is able to engage with the first drive wheel 11, and the second driven wheel 22 is connected to the second drive wheel 12 via a transmission element 23. The second drive wheel 12 and the second driven wheel 22 can be sprockets or pulleys and the transmission element 23 can be a chain or a belt.

The transmission set 30 is connected to the driven shaft 24 and transmits the power to the front wheel axle 42 and drives the bicycle forward.

By the aforementioned configuration, the drive wheel set drives the driven wheel set. Corresponding to the unidirectional rotation of the predetermined ratchet wheels 25 and 25', the drive wheel set rotates backward to drive the first driven wheel 21 to rotate forward via the first drive wheel 11. Contrarily, when the drive wheel set rotates forward, it drives the second driven wheel 22 to rotate forward by the second drive wheel 12 through the transmission element 23. Therefore, whether the drive wheel set rotates forward or backward, the transmission set 30 rotates in only one direction.

For further understanding the characteristics of the configuration of the present invention, the technology applied to the present invention, and the perspective performance, the use of the present invention is described as follows.

Figure 4:
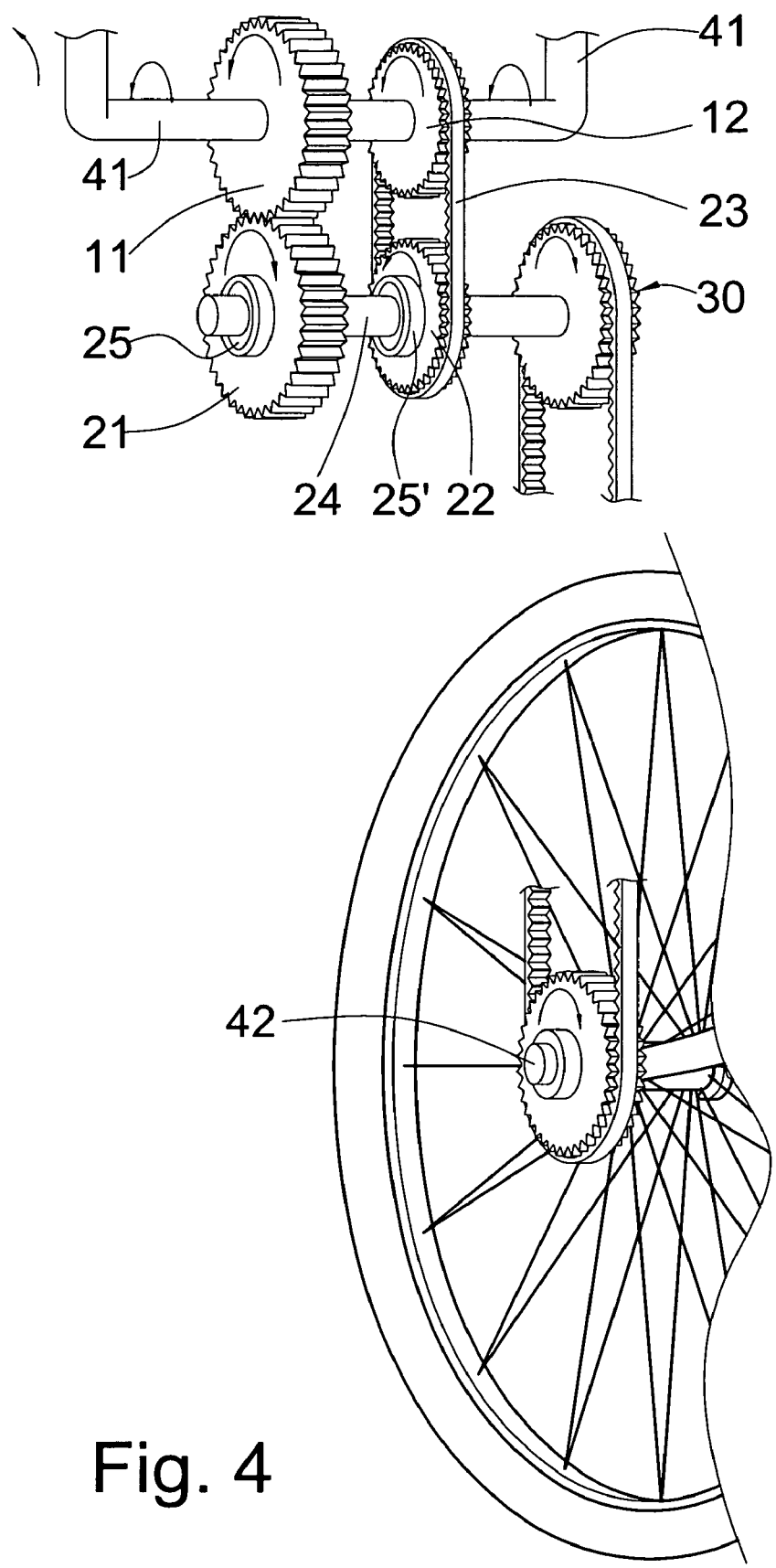
FIG. 4 illustrates forward rotation of the first preferred embodiment of the present invention.

For explaining the present invention in details, please refer to FIG. 4. When the handlebar 41 rotates backward, the drive wheel set synchronously rotates backward, in which the second drive wheel 12 rotates backward uselessly, and the second driven wheel 22 also rotates uselessly. In the meantime, the first drive wheel 11 rotates backward and drives the first driven wheel 21 to rotate forward effectively and then drives the driven shaft 24 and the transmission set 30 to rotate forward, it then drives the wheel axle 42 to rotate forward.

Figure 5:
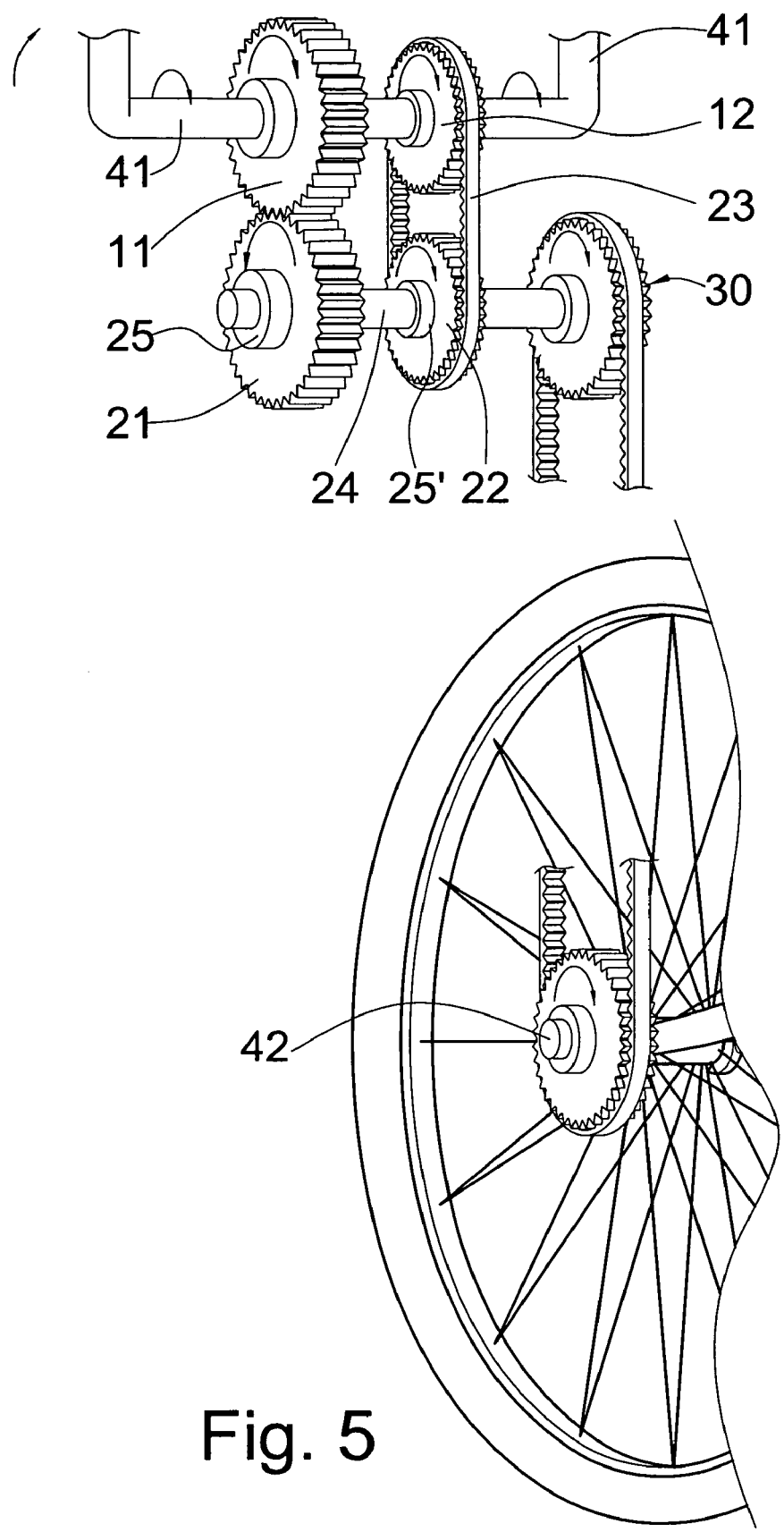
FIG. 5 illustrates backward rotation of the first preferred embodiment of the present invention.

Then, as shown in FIG. 5, when the handlebar 41 is rotated forward, the drive wheel set synchronously rotates forward. The first drive wheel 11 drives the first driven wheel 21 and makes the first driven wheel 21 rotate backward uselessly. Meanwhile, the second drive wheel 12 rotates forward effectively to propel the second driven wheel 22, the driven shaft 24 and the transmission set 30 to rotate forward, then drives the bicycle wheel axle 42 to rotate forward.

By the aforementioned configuration of the present invention, whether the handle 41 rotates forward or backward, the transmission set 30 and the wheel axle 42 always rotate forward and thus propel the bicycle to move forward.

Figure 6:
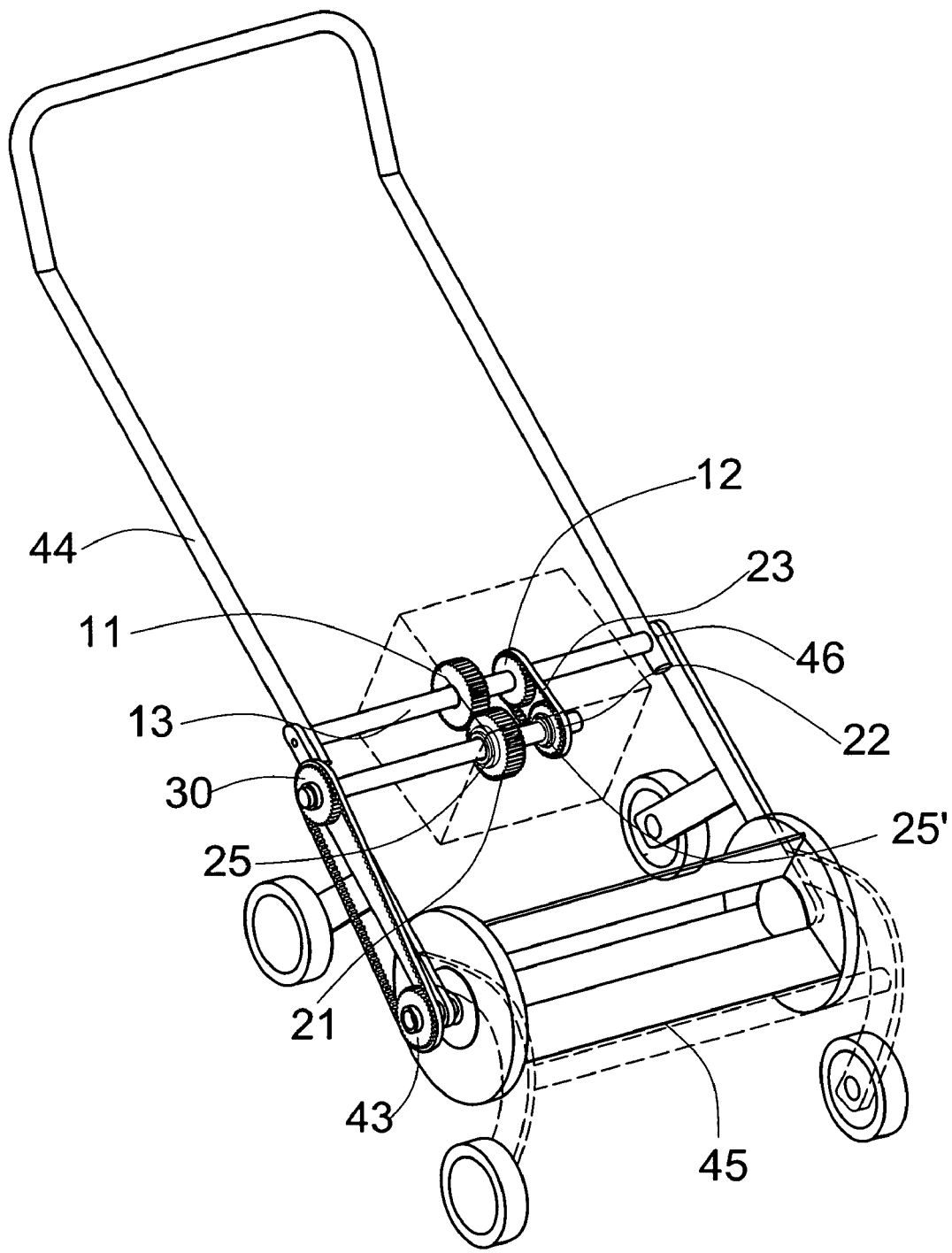
FIG. 6 illustrates the application status of the second preferred embodiment of the present invention.

Refer to FIG. 6, the second embodiment of the present invention is applied to a manual mower. The mower comprises a framework, a handle 44, a dual-ratchet wheel transmission apparatus, and a blade set 45. The handle 44 of the mower is pivoted to the framework at two pivoting points 46. And the blade set 45 is connected to the framework by a rotation axle. The rotation axle of the blade set 45 is externally integrated with a driving wheel axle 43, in which the output of the transmission set 30 is connected to the driving wheel axle 43 via chain or a belt. Therefore, by rocking the handle 44 up and down, the handle 44 is able to propel the drive wheel set, the driven wheel set, and the driving wheel axle 43. The driving wheel axle 43 then propels the blade set 45 to rotate forward for mowing the grass.

Figure 7:
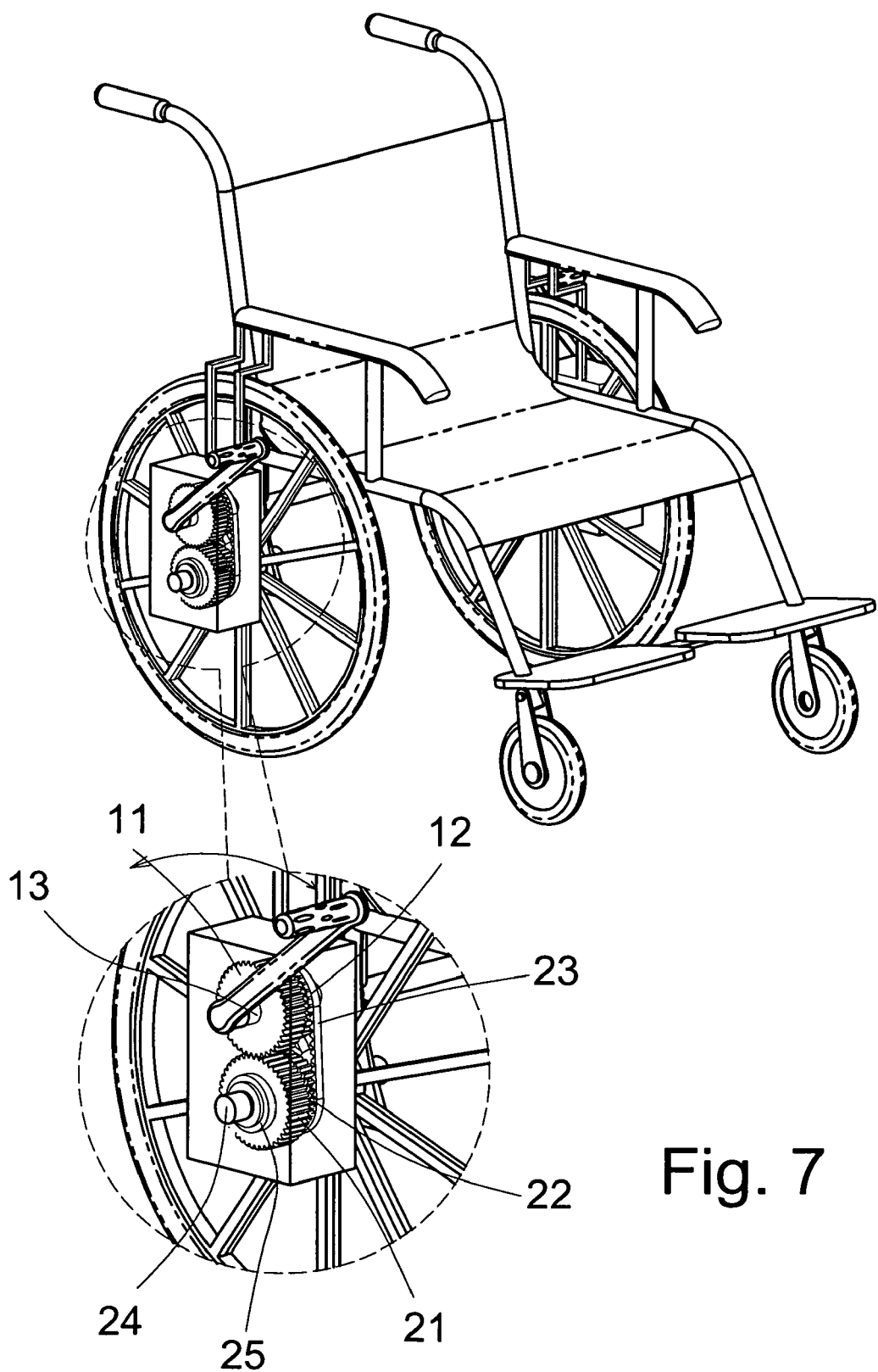
FIG. 7 illustrates the application status of the third preferred embodiment of the present invention.

Refer to FIG. 7, the third embodiment of the present invention is shown. It is an application of present invention to a manual wheelchair, in which the wheelchair has two dual-ratchet wheel transmission apparatuses, one at each side. A handle is connected to the drive shaft 13 of each dual-ratchet wheel transmission apparatuses serving as the input, and the output driven shaft 24 is connected to the wheel of the wheelchair. By swinging the handle forward and backward, it is able to drive the wheelchair to move forward. And by controlling the speed of each handle, it can steer the wheelchair.

Figure 8:
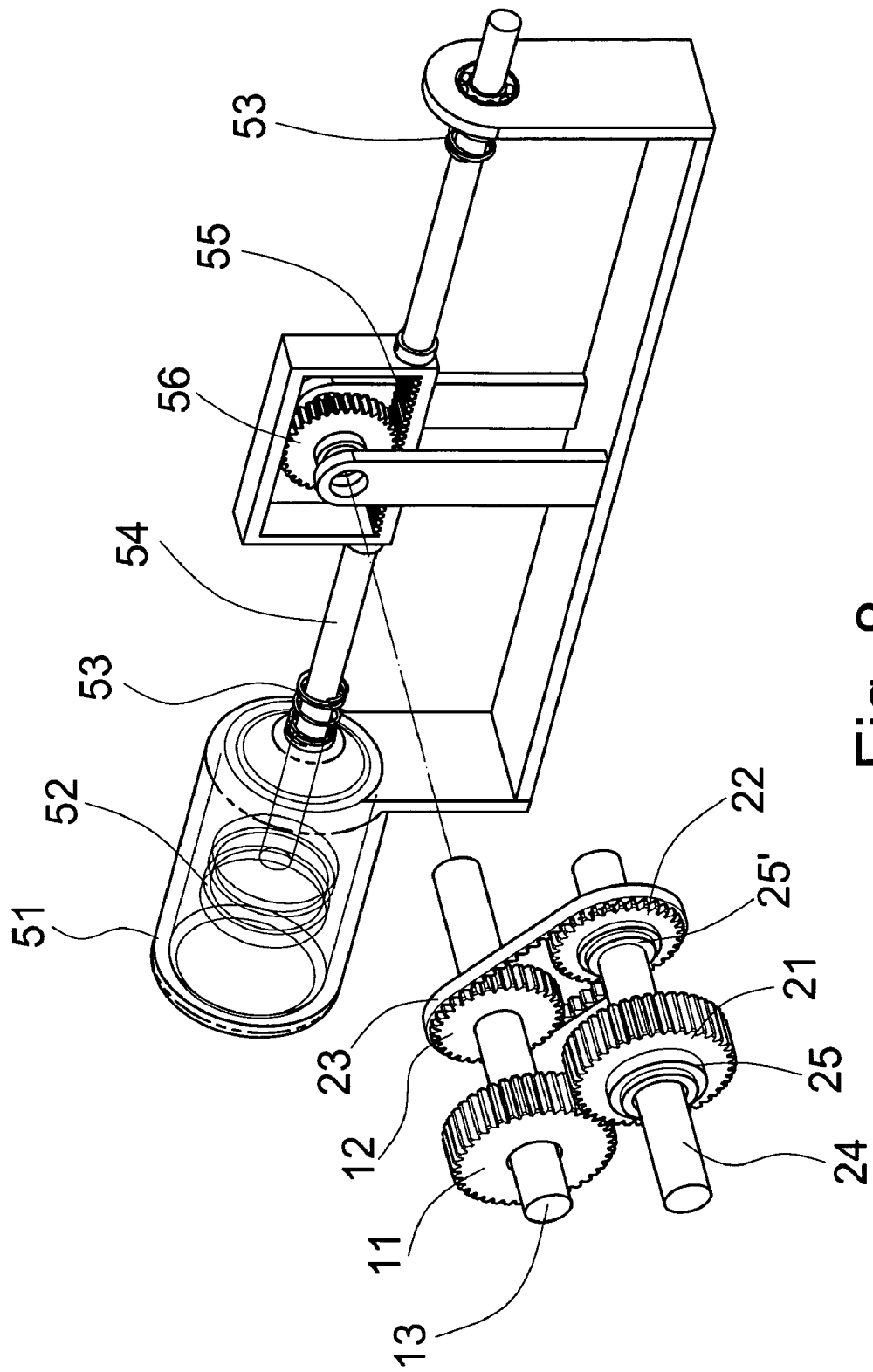
FIG. 8 is a perspective view of a dual-direction in-line engine apparatus using the dual-ratchet wheel transmission apparatus of the present invention.
Figure 9:
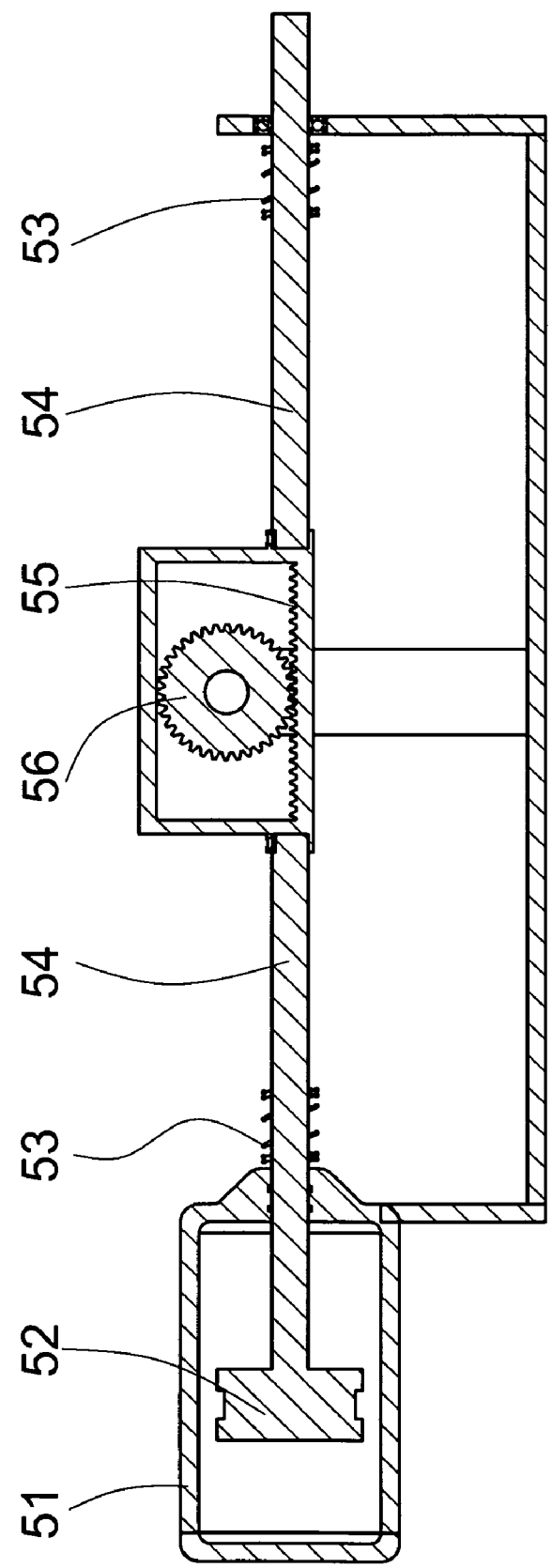
FIG. 9 is a sectional-view diagram of dual-direction in-line engine apparatus using the present invention.

Refer to FIGS. 8 and 9, the fourth embodiment of the present invention is shown. The present invention is applied to a dual-direction in-line engine, which comprises: a cylinder element 51, a piston element 52, springs 53, a linking rod 54, a rack gear 55, an output gear element 56, a drive wheel set, and a driven wheel set.

The cylinder element 51 is the main body of combustion chamber and connects to a main supporting structure.

The piston element 52 comprises a piston and a piston ring. The combustion chamber of the cylinder element 51 has two sides and is controlled to have the combustion occurs at each side of the piston alternatively. It is configured to transfer the power generated by the combustion of gasoline or diesel to the linking rod 54 via the piston.

The springs 53 are served as the returning cushion and energy storage element of the reciprocating piston.

The linking rod 54 is connected to the piston element 52 and transmits the power of the piston element 52 to a rack gear 55.

The rack gear 55 engages with the output gear element 56 for operation.

The output gear element 56 is coaxially connected to the drive shaft 13 of the drive wheel set of the present invention; it then drives the first drive wheel 11 and the second drive wheel 12. The first drive wheel 11 engages with the first driven wheel 21 and ratchet wheel 25 directly, and second drive wheel 12 engages with the second driven wheel 22 and ratchet wheel 25' by the transmission element 23. The ratchet wheels (25 and 25') will drive the driven shaft 24 alternatively and transmit the power to an output transmission apparatus.

The dual-direction in-line engine of the present invention is a mechanical apparatus with combustion taking place at each side of the piston alternatively; i.e. the reciprocating piston engine generates power stroke from both sides of the piston element 52 at alternative time. When the combustion process takes place at left side of the piston element 52, the piston element 52, the linking rod 54 and the rack gear 55 are pushed to the right direction, and when the combustion process takes place at right side of the piston element 52, the piston element 52, the linking rod 54 and the rack gear 55 are pushed to the left direction. Thus, the piston element 52, linking rod 54 and rack gear 55 reciprocate left and right as the combustion process alternatively takes place at the right and left sides of the piston element 52. And the springs 53 installed at two sides of the linking rod 54 absorb the kinetic energy of the piston element 52, linking rod 54, and rack gear 55 during the switch of the reciprocating motion and serve as a cushion mechanism to assist the returning motion of the piston.

Thus, as the piston element 52, the linking rod 54 and the rack gear 55 reciprocate, the rack gear 55 will drive the output gear element 56. Since the output gear element 56 is connected to the drive shaft 13, the reciprocating motion of the dual-direction in-line engine will propel the driven shaft 24 to rotate in only one direction by the mechanism of present invention.

The dual-ratchet wheel transmission apparatus of the present invention mainly applies a simple configuration with dual-ratchet wheels, gears and sprockets (or pulleys). The output of this new apparatus produces only one rotational direction no matter the input is given a forward or backward motion. Since the configuration of present invention is simple, it can certainly save manufacturing costs. The transmission technology of the present invention is highly applicable to industry so its market value is very high. And the configuration is novel and has not published publicly, thus, the present invention is patentable. Therefore your approval of the patent application will be greatly appreciated.

What is claimed is:

1. A dual-ratchet wheel transmission apparatus, comprising:
   a drive wheel set, having a first drive wheel and a second drive wheel;
   a driven wheel set, coaxially connected to an output element for transmission, the driven wheel set comprising a first driven wheel being integrated with a first unidirectional ratchet wheel, in which the first driven wheel engages with the first drive wheel for transmission, a second driven wheel being integrated with a second unidirectional ratchet wheel, in which the second driven wheel is connected to the second drive wheel via a transmission element for transmission.

2. The dual-ratchet wheel transmission apparatus as claimed in claim 1, wherein the second drive wheel and the second driven wheel are sprockets (chain wheels) and the transmission element is a chain.

3. The dual-ratchet wheel transmission apparatus as claimed in claim 1, wherein the second drive wheel and the second driven wheel are pulleys and the transmission element is a belt.

4. The dual-ratchet wheel transmission apparatus as claimed in claim 1, being able to apply to bicycle transmission, wherein the drive wheel set is connected to a handlebar of a bicycle, and the driven wheel set is connected to a driven shaft to transmit the power to the front wheel and propels the bicycle to move in forward direction.

5. The dual-ratchet wheel transmission apparatus as claimed in claim 1, wherein the drive wheel set has the first drive wheel and the second drive wheel coaxially integrated with a drive shaft.

6. The dual-ratchet wheel transmission apparatus as claimed in claim 1, wherein the driven wheel set has the first driven wheel and the second driven wheel mounted on a driven shaft.

7. The dual-ratchet wheel transmission apparatus as claimed in claim 6, wherein a transmission set is coaxially connected to the driven shaft, and receives the power or torque from the driven shaft.

8. The dual-ratchet wheel transmission apparatus as claimed in claim 1, wherein the first driven wheel is centrally integrated with the second unidirectional ratchet wheel.

9. The dual-ratchet wheel transmission apparatus as claimed in claim 1, wherein the second driven wheel is centrally integrated with the first unidirectional ratchet wheel.

* * * * *